United States Patent [19]
Castellucci

[11] Patent Number: 5,724,907
[45] Date of Patent: Mar. 10, 1998

[54] WATERCRAFT STEERING MOUNTED ACCESSORY CONTROL ASSEMBLY

[75] Inventor: Larry K. Castellucci, Reading, Pa.

[73] Assignee: Teleflex Incorporated, Plymouth Meeting, Pa.

[21] Appl. No.: 685,250

[22] Filed: Jul. 23, 1996

[51] Int. Cl.⁶ .................................................. B63H 25/00
[52] U.S. Cl. .................................. 114/144 R; 74/484 R; 440/61
[58] Field of Search .................................. 440/61, 53, 900, 440/113, 84–87; 180/78; 307/10.1; 340/825.72; 74/484 R, 486; 114/144 R; 200/61.27, 61.54; 280/779

[56] References Cited

U.S. PATENT DOCUMENTS

| | | | |
|---|---|---|---|
| 3,208,300 | 9/1965 | Morse | 74/484 R |
| 4,277,658 | 7/1981 | Delp et al. | 200/61.54 |
| 4,840,078 | 6/1989 | Shitanoki | 74/484 R |
| 5,337,694 | 8/1994 | Nix et al. | |
| 5,575,177 | 11/1996 | Poleschuk et al. | 74/484 R |

*Primary Examiner*—Ed L. Swinehart
*Attorney, Agent, or Firm*—Howard & Howard

[57] ABSTRACT

An accessory switch assembly is positioned between the steering wheel 12 and the bezel housing 14 surrounding the steering shaft 16. The assembly comprises a bracket including a mounting section 26 and two arms 28 which extend radially from opposite sides of the mounting section 26. The mounting section 26 includes a plurality of pairs 32 and 34 of mounting holes and a first plurality of mounting holes 30 disposed in a hexongonal pattern on a first circle for attachment to anyone of various different bezel housings 14. The mounting section 26 also includes access holes 36 for access therethrough for bolts to mount the bezel housing 14. Each radial arm 28 includes tabs 40 and side flanges 44 extending transversely along the sides of the arm 28 to define a pocket for a switch 38. Each switch 38 includes a threaded collar 46 extending through the opening 42 in the associated tab 40 and a first lock nut 48 threadedly engages the collar 46 on the exterior of the tab 40 to secure the switch 38 to the tab 40 of the arm 28. An operating lever 50 extends radially from the end of each switch 38 and through the opening 42 in the associated tab 40. A wiring harness 60 interconnects the switch 38 and wiring in the boat for controlling the position of the trim tab, or the like.

16 Claims, 4 Drawing Sheets

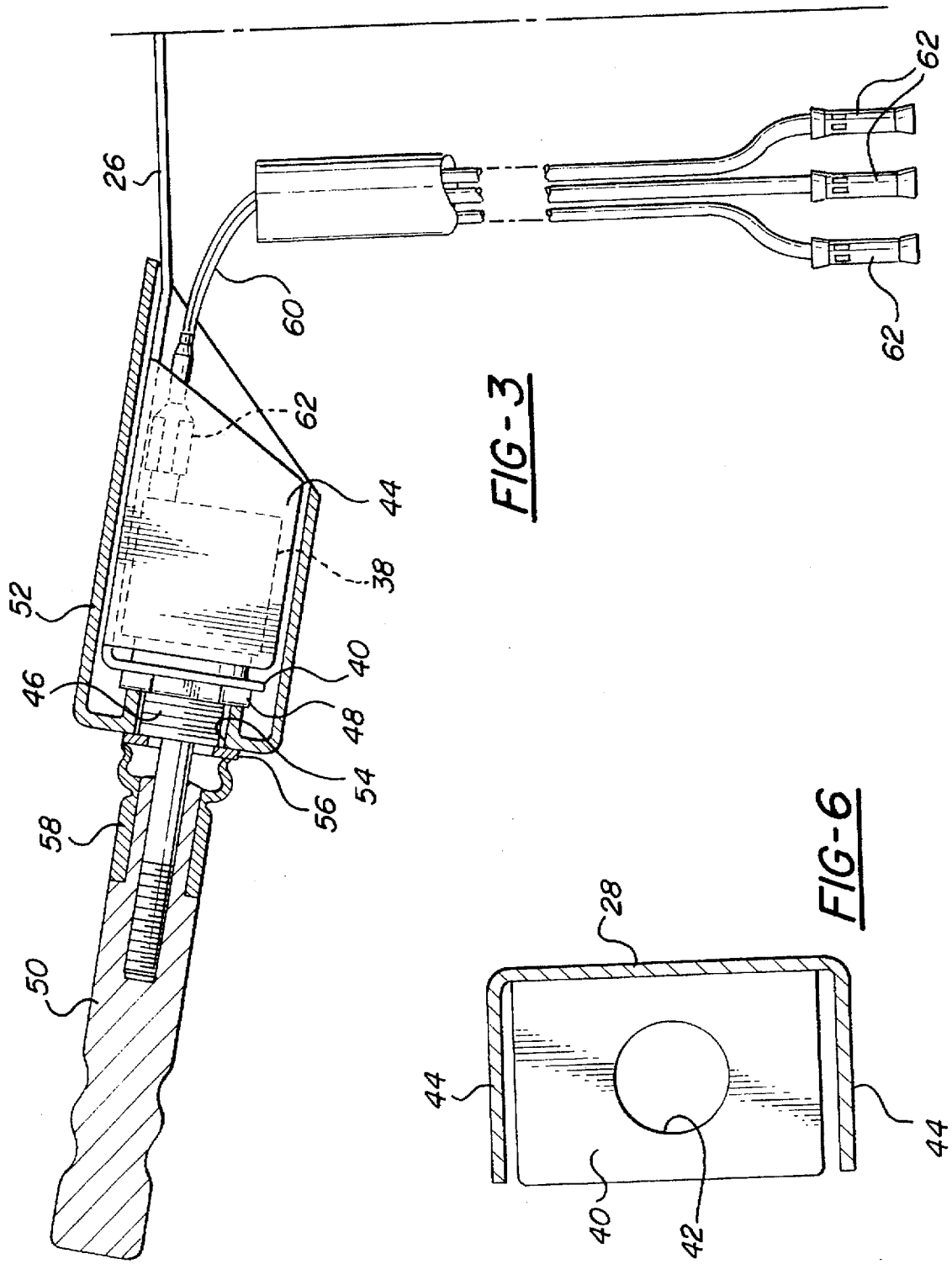

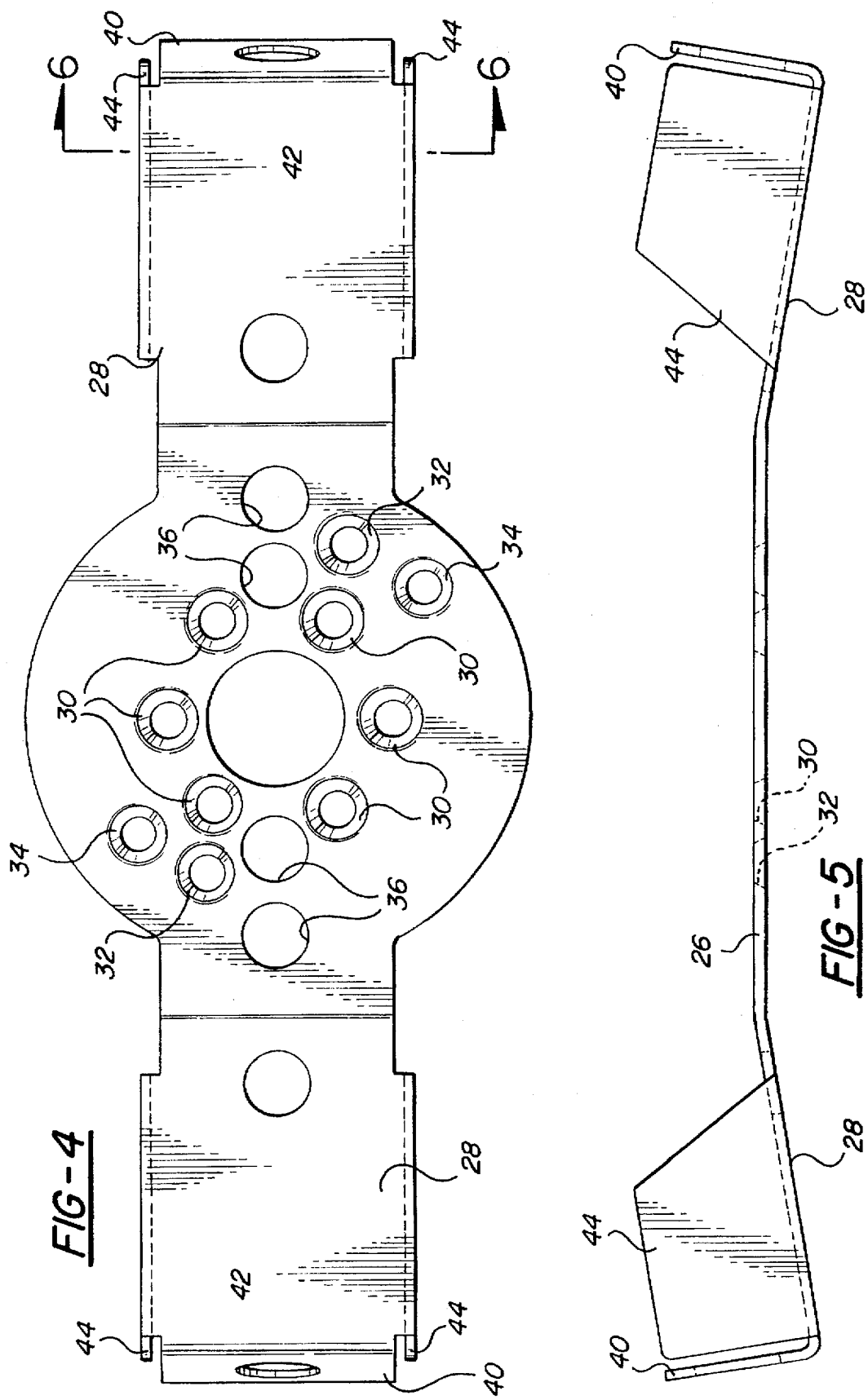

5,724,907

WATERCRAFT STEERING MOUNTED ACCESSORY CONTROL ASSEMBLY

TECHNICAL FIELD

The subject invention relates to the control of various accessory units on a watercraft such as a pleasure boat.

BACKGROUND OF THE INVENTION

Typical of accessories used in the marine industry are trim tabs which boaters are constantly adjusting during the operation of a boat. The control switches for such accessories are often located a reaching distance from the steering wheel, yet it frequently occurs that the operator of a boat finds it troublesome to let go of the steering wheel with one hand to actuate such accessories, as in high seas. It is, therefore, desirable to place such accessory controls next adjacent the steering wheel. This placement is more easily accomplished in the original manufacture of the marine vehicle than it is in the aftermarket. An example of an aftermarket assembly is shown in U.S. Pat. No. 5,337,694 to Nix et al. When the control switches are mounted on the steering wheel, the complexity is increased because of the wiring problem resulting from the rotation of the steering wheel to wrap the wiring around the steering axis. In systems mounted adjacent the steering wheel, it is difficult to provide for easy installation and universal adaptation for various different steering systems utilized by different boat manufacturers.

SUMMARY OF THE INVENTION AND ADVANTAGES

A watercraft accessory switch assembly for controlling trim and/or other accessories and positioned between the steering wheel and the bezel housing surrounding the steering shaft and comprising a bracket including a mounting section and at least one radially extending arm supporting a switch assembly having an operating lever extending radially from the end thereof. The assembly is characterized by the mounting section of the bracket including mounting holes for attachment to the bezel housing.

Accordingly, an accessory switch assembly is provided which may be placed next adjacent the steering wheel, yet is easily installed and is adapted to be installed with anyone of various different steering bezel configurations.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross sectional view of one half of the preferred embodiment;

FIG. 4 is a plan view of the bracket of the preferred embodiment;

FIG. 5 is a side view of FIG. 4; and

FIG. 6 is a cross sectional view taken along line 6—6 of FIG. 4.

DETAILED DESCRIPTION OF THE PREFERRED EMBODIMENT

Figure 1:
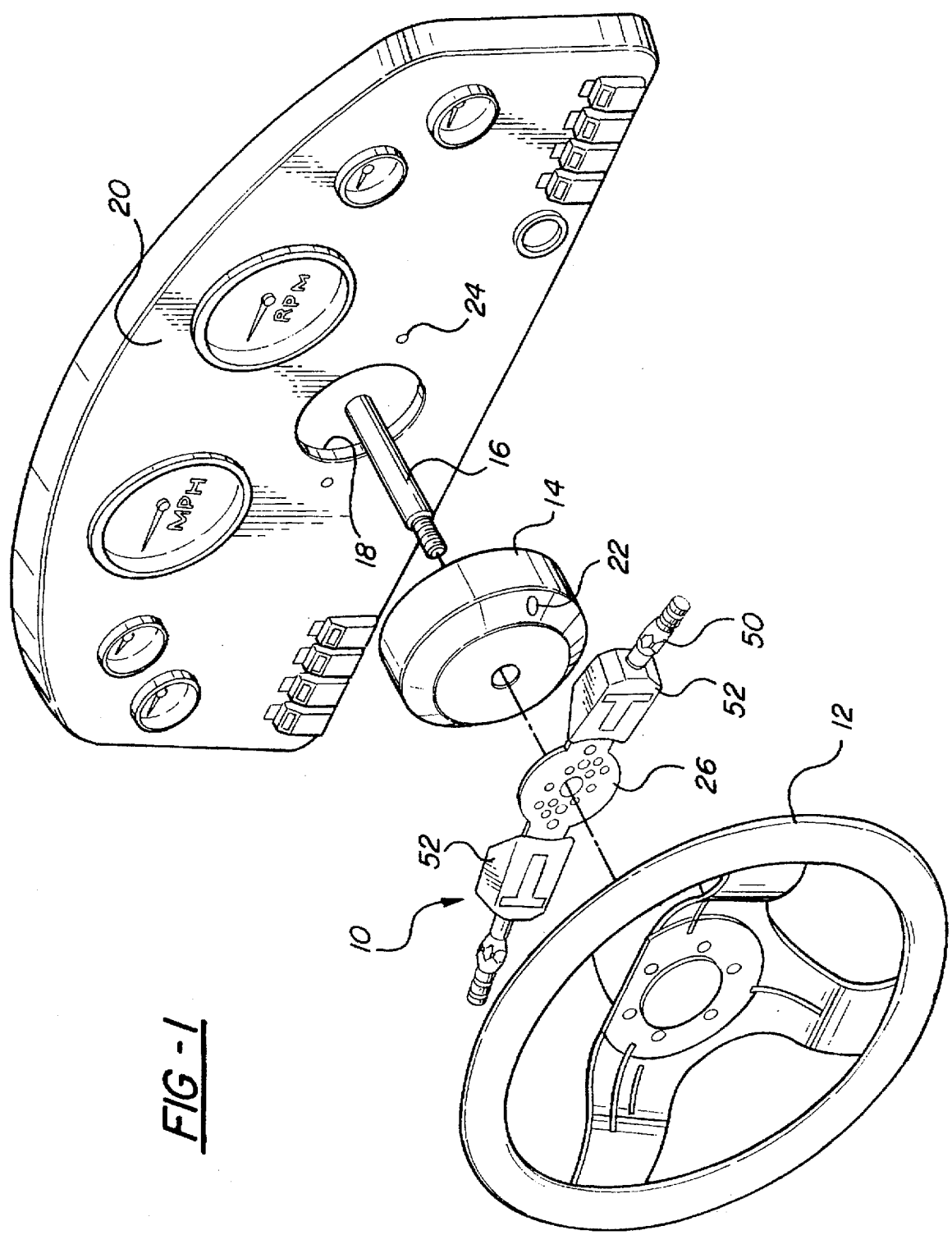
FIG. 1 is an exploded perspective view of a marine steering assembly incorporating the subject invention.
Figure 2:
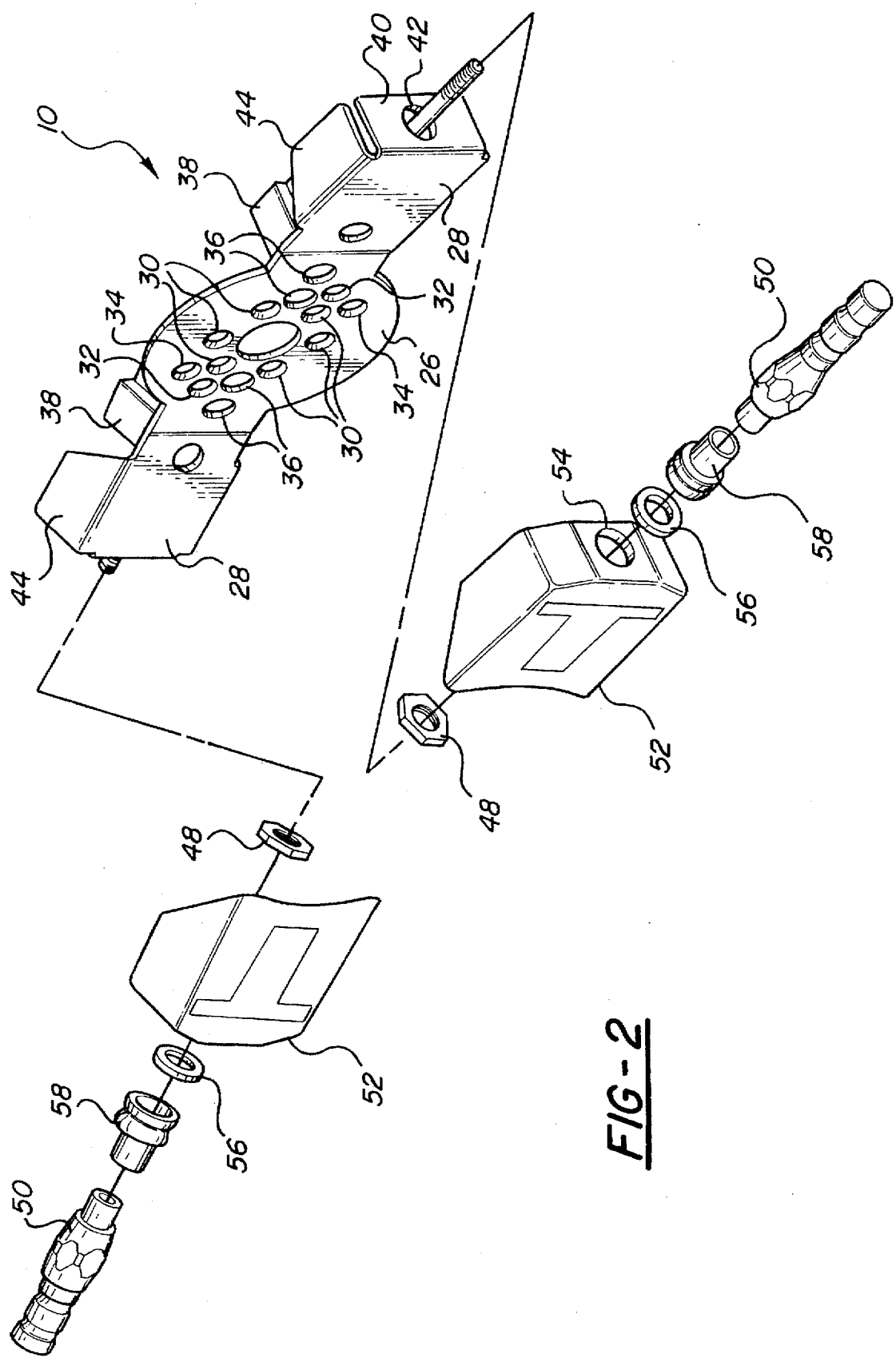
FIG. 2 is an exploded perspective view of a preferred embodiment of the switch assembly of the subject invention.

Referring to the Figures, wherein like numerals indicate like or corresponding parts throughout the several views, a watercraft accessory switch assembly for controlling trim and/or other accessories is generally shown at 10. The accessory switch assembly is positioned between the steering wheel 12 and the bezel housing 14 surrounding the steering shaft 16. The steering shaft 16 extends through an opening 18 in the instrument panel 20 of a boat. The bezel housing 14 is secured to the instrument panel 20 by screws (not shown) which extend through the apertures 22 in the bezel housing and through the holes 24 in the instrument panel 20.

The assembly comprises a bracket including a mounting section 26 and two arms 28 which extend radially from opposite sides of the mounting section 26, i.e., 180° apart. As will be appreciated as the description proceeds, the bracket may include only one arm 28.

The mounting section 26 includes mounting holes for attachment to the bezel housing 14. Since boat steering systems vary in design, various different bezel housings 14 are presented for use of the subject invention; therefore, the mounting section 26 includes a plurality of mounting holes for attachment to anyone of various different bezel housings. More specifically, the plurality of mounting holes includes a first plurality of mounting holes 30 disposed on a first diameter and a first pair 32 disposed on a second diameter. There may be included a second pair 34 of mounting holes disposed on a second diameter for mounting to yet another bezel housing. The mounting section 26, therefore, includes a plurality of pairs 32 and 34 of mounting holes and the first plurality of mounting holes 30, which comprise six holes 30 disposed in a hexagonal pattern on the first diameter, for attachment to anyone of various different bezel housings. All of the mounting holes are countersunk for accommodating screws. The mounting section 26 also includes access holes 36 in the mounting section 26 for access therethrough for the mounting fasteners, e.g., bolts, for the bezel housing 14, there being a plurality of such access holes at radially different positions to accommodate various different bezel housings. The mounting fasteners (not shown) for the bezel housing 14 extend through the apertures 22 in the bezel housing 14 and through the holes 24 in the instrument panel 20.

A switch assembly 38 is supported by each of the arms 28. More specifically, the bracket comprises a sheet of material and each of the radial arms 28 terminates in a transverse tab 40 at the distal end thereof. Each tab 40 is bent or formed at a transverse or 90° angle and defines an opening 42 therethrough. Each radial arm 28 also includes side flanges 44 extending transversely or at 90° along the sides of the arm 28 to define a pocket with the tab 40 for the switch 38. The radial arms 28 are disposed at an upward slanting angle relative to the countersunk face of the mounting section 26 for positioning the switches 38 closely under the steering wheel 12.

Each switch 38 includes a threaded collar 46 extending through the opening 42 in the associated tab 40 and a first lock nut 48 threadedly engages the collar 46 on the exterior of the tab 40 to secure the switch 38 to the tab 40 of the arm 28. An operating lever 50 extends radially from the end of each switch 38 and through the opening 42 in the associated tab 40. The switch 38 is a toggle switch which toggles in opposite directions from the neutral position; it may be biased to the neutral position whereby the lever 50 returns to neutral upon release or it may be necessary to manually return the lever 50 to neutral.

A cover 52 is disposed over each tab 40 and the flanges 44 at the distal ends of the arms 28. The cover 52 includes an aperture 54 surrounding the collar 46 to dispose the cover 52 over the first lock nut 48. A second lock nut 56 threadedly engages the collar 46 exteriorly of the aperture 54 for securing the cover 52 to the tab 40 of the arm 28.

A flexible boot 58 surrounds the operating lever 50 and the second locking nut 56 The exterior of the second lock nut 56 is knurled to frictionally retain the boot 58 thereon.

The assembly also includes a wiring harness 60 releasably connected to the switch 38. The harness 60 for each switch 38 comprises three electrical leads, preferably of three different colors, with connectors 62 on the opposite ends for quick connection and disconnection. The connectors 62 at the ends opposite to the switches 38 are normally connected to existing control wiring in the boat.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A watercraft accessory switch assembly for controlling trim and/or other accessories and positioned between the steering wheel and the bezel housing surrounding the steering shaft, said assembly comprising;

a bracket including a mounting section and at least one radially extending arm, a switch assembly supported by said arm and including an operating lever extending radially from the end thereof, and characterized by said mounting section of said bracket including mounting holes for attachment to the bezel housing.

2. An assembly as set forth in claim 1 wherein said mounting section includes a plurality of mounting holes for attachment to anyone of various different bezel housings.

3. An assembly as set forth in claim 1 wherein said mounting section includes a plurality of pairs of holes for attachment to anyone of various different bezel housings.

4. An assembly as set forth in claim 2 including access holes in said mounting section for access therethrough for the mounting fasteners for the bezel housing.

5. An assembly as set forth in claim 4 wherein said plurality of mounting holes includes a first plurality disposed on a first diameter and a first pair disposed on a second diameter.

6. An assembly as set forth in claim 5 including a second pair of said mounting holes.

7. An assembly as set forth in claim 6 wherein said first plurality of mounting holes comprise six holes disposed in a hexongonal pattern on said first diameter.

8. An assembly as set forth in claim 2 wherein said radial arm is disposed at an angle relative to said mounting section for positioning said switch closely under the steering wheel.

9. An assembly as set forth in claim 8 wherein said bracket comprises a sheet and said radial arm terminates in a transverse tab at the distal end thereof, said tab having an opening therethrough and said operating lever extends through said opening.

10. An assembly as set forth in claim 9 wherein said radial arm includes side flanges extending transversely along the sides of said arm to define a pocket with said tab for said switch.

11. An assembly as set forth in claim 10 including a cover disposed over said tab and said flanges at said distal end of said arm.

12. An assembly as set forth in claim 11 wherein said switch includes a threaded collar extending through said tab and a first lock nut threadedly engaging said collar on the exterior of said tab to secure said switch to said tab of said arm.

13. An assembly as set forth in claim 12 wherein said cover includes an aperture surrounding said collar to dispose said cover over said first lock nut, a second lock nut threadedly engaging said collar exteriorly of said aperture for securing said cover to said tab of said arm.

14. An assembly as set forth in claim 13 including a flexible boot surrounding said operating lever and said second locking nut.

15. An assembly as set forth in claim 14 including a wiring harness releasable connected to said switch.

16. An assembly as set forth in claim 15 wherein said mounting holes are countersunk.

* * * * *